(12) United States Patent
Lin et al.

(10) Patent No.: US 10,779,324 B2
(45) Date of Patent: Sep. 15, 2020

(54) METHOD OF TRANSMITTING INFORMATION, NETWORK DEVICE AND COMPUTER-READABLE MEDIUM

(71) Applicant: GUANGDONG OPPO MOBILE TELECOMMUNICATIONS CORP., LTD., Dongguan, Guangdong (CN)

(72) Inventors: Yanan Lin, Guangdong (CN); Hua Xu, Ottawa (CA)

(73) Assignee: GUANGDONG OPPO MOBILE TELECOMMUNICATIONS CORP., LTD., Dongguan, Guangdong (CN)

(*) Notice: Subject to any disclaimer, the term of this patent is extended or adjusted under 35 U.S.C. 154(b) by 0 days.

(21) Appl. No.: 16/232,192

(22) Filed: Dec. 26, 2018

(65) Prior Publication Data
US 2019/0132868 A1   May 2, 2019

Related U.S. Application Data

(63) Continuation-in-part of application No. PCT/CN2016/101105, filed on Sep. 30, 2016.

(51) Int. Cl.
| | | |
|---|---|---|
| H04W 74/08 | (2009.01) | |
| H04L 5/00 | (2006.01) | |
| H04W 74/00 | (2009.01) | |
| H04W 72/04 | (2009.01) | |
| H04L 1/18 | (2006.01) | |

(52) U.S. Cl.
CPC ........... *H04W 74/08* (2013.01); *H04L 1/1861* (2013.01); *H04L 5/0055* (2013.01); *H04W 72/04* (2013.01); *H04W 74/004* (2013.01)

(58) Field of Classification Search
CPC ....... H04L 5/003; H04L 5/0057; H04L 47/74; H04L 2012/5631; H04L 1/1861; H04L 47/78; H04L 5/0055; H04W 28/00; H04W 72/00; H04W 74/08; H04W 72/04; H04W 74/004
See application file for complete search history.

(56) References Cited

U.S. PATENT DOCUMENTS

| | | | | |
|---|---|---|---|---|
| 2017/0310431 | A1* | 10/2017 | Iyer | ........................ H04L 1/1816 |
| 2018/0191469 | A1* | 7/2018 | Zou | ........................ H04L 1/1861 |

FOREIGN PATENT DOCUMENTS

| | | |
|---|---|---|
| CN | 101114868 | 1/2008 |
| CN | 101860966 | 10/2010 |
| CN | 103178942 | 6/2013 |

(Continued)

OTHER PUBLICATIONS

WIPO, ISR for PCT/CN2016/101105, dated Jun. 22, 2017.
(Continued)

*Primary Examiner* — Nishant Divecha
(74) *Attorney, Agent, or Firm* — Hodgson Russ LLP (57) ABSTRACT

A method of transmitting information includes: detecting an uplink signal sent by a terminal device; and sending acknowledgment information to the terminal device through a first resource if the uplink signal is detected, wherein the first resource is associated with information of the terminal device. With the method of transmitting information, a network device and a terminal device according to embodiments of the present disclosure, collision of feedback information between different terminal devices can be avoided.

14 Claims, 3 Drawing Sheets

(56) References Cited

FOREIGN PATENT DOCUMENTS

CN      103973397      8/2014
WO      2012087199     6/2012

OTHER PUBLICATIONS

Intel Corporation, "Grant-less and non-orthogonal UL transmissions in NR," 3GPP TSG-RAN WG1 #86, R1-167698, Aug. 2016, 5 pages.
LG Electronics, "Considerations on contention based MA," 3GPP TSG RAN WG1 Meeting #86, R1-166877, Aug. 2016, 4 pages.
EPO, Office Action for EP Application No. 16917288.9, dated Jul. 1, 2019.
EPO, Office Action for EP Application No. 16917288.9, dated Apr. 15, 2020.
SIPO, First Office Action for CN Application No. 201680086632.1, dated Jun. 3, 2020.

* cited by examiner

METHOD OF TRANSMITTING INFORMATION, NETWORK DEVICE AND COMPUTER-READABLE MEDIUM

CROSS-REFERENCE TO RELATED APPLICATIONS

This application is a continuation-in-part of International Application PCT/CN2016/101105, filed on Sep. 30, 2016, the entire disclosure of which is incorporated herein by reference.

TECHNICAL FIELD

The present disclosure relates to the field of communications, and more particularly, to a method of transmitting information, a network device and a computer-readable medium.

BACKGROUND

Acknowledgement/negative-acknowledgement (ACK/NACK) signals (collectively referred to as feedback information) to Long term evolution (LTE) uplink transmission are transmitted to a terminal device by using a downlink physical hybrid ARQ indicator channel (PHICH). After receiving the NACK, the terminal device may perform non-adaptive uplink retransmission without an uplink scheduling instruction sent by a network device. The network device may also send the uplink scheduling instruction to notify the terminal device to perform adaptive uplink retransmission.

SUMMARY

There are provided a method of transmitting information, a network device and a computer-readable medium.

In a first aspect, there is provided a method of transmitting information including:
detecting an uplink signal sent by a terminal device; and
sending acknowledgment information to the terminal device through a first resource if the uplink signal is detected, wherein the first resource is associated with information of the terminal device.

In a second aspect, there is provided a method of transmitting information including:
sending an uplink signal to a network device; and
detecting feedback information, which is corresponding to the uplink signal and sent from the network device, through a first resource, wherein the first resource is associated with information of a terminal device.

In a third aspect, there is provided a network device which includes modules for executing the method in the first aspect or any of possible implementation modes of the first aspect.

In a fourth aspect, there is provided a terminal device which includes modules for executing the method in the second aspect or any of possible implementation modes of the second aspect.

In a fifth aspect, there is provided a network device. The network device includes a processor, a memory, and a communication interface. The processor is connected with the memory and the communication interface. The memory is configured to store instructions, the processor is configured to execute the instructions, and the communication interface is configured to communicate with other network elements under control of the processor. The instructions stored by the memory when executed by the processor cause the processor to perform the method in the first aspect or any of possible implementation modes of the first aspect.

In a sixth aspect, there is provided a terminal device. The terminal device includes a processor, a memory, and a communication interface. The processor is connected with the memory and the communication interface. The memory is configured to store instructions, the processor is configured to execute the instructions, and the communication interface is configured to communicate with other network elements under control of the processor. The instructions stored by the memory when executed by the processor cause the processor to perform the method in the second aspect or any of possible implementation modes of the second aspect.

In a seventh aspect, there is provided a computer-readable medium for storing a computer program which includes instructions for executing the method in the first aspect or any of possible implementation modes of the first aspect.

In an eighth aspect, there is provided a computer-readable medium for storing a computer program which includes instructions for executing the method in the second aspect or any of possible implementation modes of the second aspect.

BRIEF DESCRIPTION OF THE DRAWINGS

In order to describe the technical solutions of embodiments of the present disclosure more clearly, brief description of the accompanying drawings to be used in embodiments of the present disclosure will be made below. Apparently, the accompanying drawings in the following description show merely some embodiments of the present disclosure, and other drawings can also be obtained from these accompanying drawings without creative efforts for an ordinary person skilled in the art.

DETAILED DESCRIPTION

The technical solutions in embodiments of the present disclosure will be clearly and completely described in the following with reference to the accompanying drawings in embodiments of the present disclosure. It is obvious that the described embodiments are part but not all of embodiments of the present disclosure. All other embodiments obtained by those of ordinary skilled in the art based on the embodiments of the present disclosure without any creative efforts shall fall within the scope of protection of the present disclosure.

In the design of 5G system, a new function is introduced, that is, the terminal device may directly perform unscheduled uplink access without the uplink scheduling instruction sent by the network device. The purpose of this is to save uplink scheduling resources and to reduce latency. However, it is disadvantageous that uplink access data packets sent by the terminal device may collide because there is no scheduling coordination by the network device, which thus affects the access performance. It is another problem as to how the network device notifies the terminal device of reception of the uplink access signal from the terminal device, which can be based on for the terminal device to decide whether to retransmit the uplink access signal or not.

In LTE, PHICH channel resources allocated to the terminal device are decided by an initial resource block of the terminal device's uplink transmission. If two terminals use the same initial resource block for uplink multi-user multiple-input multiple-output (MIMO) transmission, the PHICH resource of one terminal device is adjusted by an offset in the uplink scheduling instruction so as to avoid collision of PHICH resources of the two terminal devices. In the uplink transmission without grant, the terminal device cannot be notified of such an offset since there is no uplink scheduling instructions. In addition, since there is no scheduling, it is impossible to determine that which resource block is used by each terminal device as the initial resource for uplink signal transmission, which tends to result in a collision of feedback information between different terminal devices.

Figure 1:
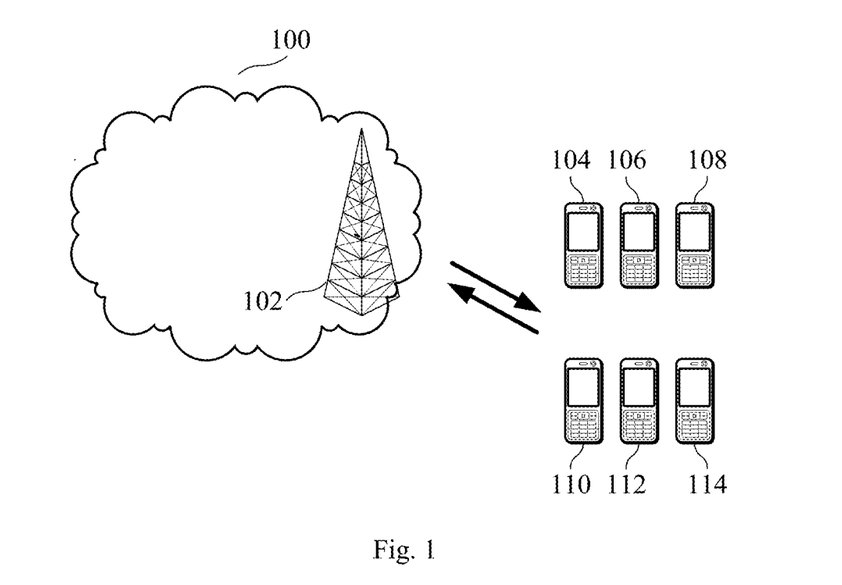
FIG. 1 is a schematic diagram of a communication system to which embodiments of the present disclosure may be applied.

FIG. 1 shows a schematic view of a communication system applied in embodiments of the present disclosure. As shown in FIG. 1, a network 100 may include a network device 102 and terminal devices 104, 106, 108, 110, 112 and 114. The network device is connected with the terminal devices through wireless connections. It should be understood that the network including one network device in FIG. 1 is taken as merely an example for explanation. However, embodiments of the present disclosure are not limited thereto. For example, the network may also include more network devices. Similarly, the network may also include more terminal devices. Besides, the network device may also include other devices.

In the present disclosure, individual embodiments are described with reference to a terminal device. A terminal device may be a UE (User Equipment), an access terminal, a user unit, a user station, a mobile radio station, a mobile station, a remote station, a remote terminal, a mobile device, a user terminal, a terminal, a wireless communication device, a user agent or a user device. An access terminal may be a cell phone, a cordless phone, an SIP (Session Initiation Protocol) phone, a WLL (Wireless Local Loop) station, a PDA (Personal Digital Assistant), a hand-held device with a wireless communication function, a computing device or other processing devices connected to a wireless modem, a vehicle-mounted device, a wearable device, a terminal device in a future 5G network, a terminal device in a future evolved PLMN (Public Land Mobile Network), or the like.

In the present disclosure, individual embodiments are described with reference to a network device. A network device may be a device for communicating with a terminal device and may be a BTS (Base Transceiver Station) in GSM (Global System for Mobile Communications) or CDMA (Code Division Multiple Access), an NB (NodeB) in a WCDMA (Wideband Code Division Multiple Access) system, an eNB or eNodeB (Evolutional Node B) in an LTE system, or a wireless controller on a CRAN (Cloud Radio Access Network) scene. Alternatively, the network device may be a relay station, an access point, a vehicle-mounted device, a wearable device, a network device in a future 5G network, a network device in a future evolved PLMN network, or the like.

In the embodiments of the present disclosure, the term "resource" means a resource used for information transmission, which may include such resources as frequency domain, time domain, code domain and sequence. The present disclosure does not have any limit about this. Information that identifies the resource may include such information as location, index, bit and serial number, and the present disclosure does not have any limit about this, either.

In the embodiments of the present disclosure, the term "acknowledge information pre-configured resource pool" means a pre-configured pool of resources for transmitting feedback information such as acknowledgement information or negative-acknowledgement information form a network device to a terminal device.

Figure 2:
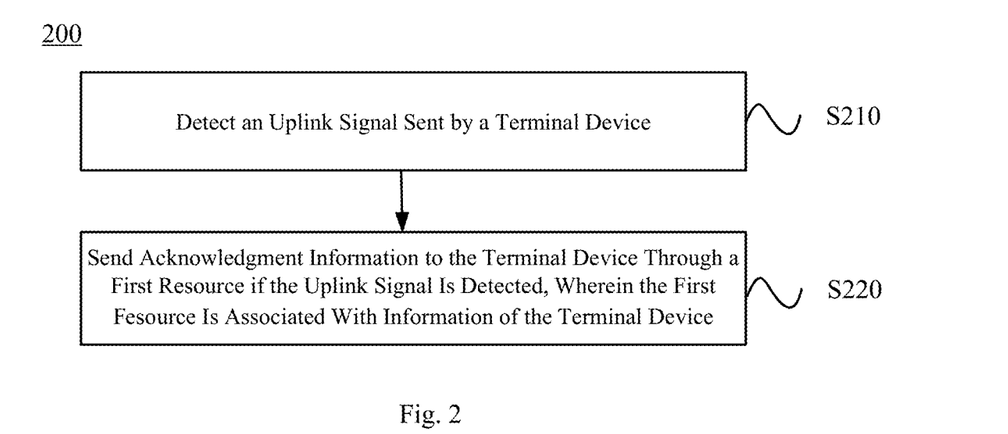
FIG. 2 is a schematic flow chart of a method of transmitting information of one embodiment of the present disclosure.

FIG. 2 shows a schematic flow chart of a method 200 of transmitting information according to an embodiment of the present disclosure. The method 200 is executed by a network device, for example, the network device 102 in FIG. 1. As shown in FIG. 2, the method 200 includes the following steps.

S210, detect an uplink signal sent by a terminal device; and

S220, send acknowledgment information to the terminal device through a first resource if the uplink signal is detected, wherein the first resource is associated with information of the terminal device.

In embodiments of the present disclosure, the first resource for sending the acknowledgment information is associated with the information of the terminal device. As such, different first resources are used to send the acknowledgment information for different terminal devices. Thus, the acknowledgment information sent to the different terminal devices may not collide.

Therefore, with the method of transmitting information provided by embodiments of the present disclosure, collision of feedback information among different terminal devices can be avoided by sending the acknowledgment information to a terminal device through the first resource that is associated with information of the terminal device.

Optionally, in one embodiment of the present disclosure, the uplink signal is sent without grant, i.e. in an unscheduled/grant-free mode.

In the unscheduled/grant-free mode, the terminal device sends the uplink signal on the resource that is determined by the terminal device. That is, the resource for sending the uplink signal may be selected freely by the terminal device.

Optionally, in one embodiment of the present disclosure, before sending the acknowledgement information, the method further includes determining the first resource based on the information of the terminal device. Then, the acknowledgement information is sent to the terminal device through the determined first resource in the step S220.

In embodiments of the present disclosure, the manner in which the first resource is associated with the information of the terminal device may be any manner, and the present disclosure does not have any limit about this. In addition, the information of the terminal device may be any information which distinguishes the terminal device from other terminal devices, and the present disclosure does not have any limit about this, either.

Optionally, in one embodiment of the present disclosure, determining the first resource based on the information of the terminal device includes determining the first resource based on identification information of the terminal device.

For example, an index that identifies the first resource may be in direct correlation with the identification information of the terminal device. For example, the index may be the value of an identity of the terminal device or a function of the value of the identifier of the terminal device.

Optionally, the identification information of the terminal device may be an RNTI (Radio Network Temporary Identity) or a pre-configured identity of the terminal device. Optionally, the pre-configured identity may be configured for the terminal device by the network device.

Optionally, in one embodiment of the present disclosure, determining the first resource based on the information of the terminal device includes determining the first resource based on the identification information of the terminal device and at least one of the following:

a starting resource that transmits the uplink signal; and
an initial resource of an acknowledgment information pre-configured resource pool.

That is, the first resource is determined based on the identification information of the terminal device and the starting resource that transmits the uplink signal, or by the identification information of the terminal device and the initial resource of the acknowledgment information pre-configured resource pool, or by the identification information of the terminal device, the starting resource that transmits the uplink signal and the initial resource of the acknowledgment information pre-configured resource pool.

For example, the index that identifies the first resource may be in direct correlation with the above-mentioned relevant factors, and for example, may be a function of the above-mentioned relevant factors.

Optionally, as an example, the first resource can be determined based on the identification information of the terminal device, the starting resource that transmits the uplink signal, the initial resource of the acknowledgement information pre-configured resource poll and a size of the acknowledgement information pre-configured resource poll. In an example, any one of location, index, bit, serial number or the like of the first resource can be determined based on the above-listed information.

Optionally, as an example, determining the first resource based on the information of the terminal device may include determining the first resource based on the following formula:

$$p = K + (m + \text{ID}) \bmod(L) \quad (1),$$

wherein P denotes index information of the first resource, K denotes information of the initial resource of the acknowledgment information pre-configured resource pool, m denotes information of the starting resource that transmits the uplink signal, ID denotes the identification information of the terminal device, and L denotes the size of the acknowledgment information pre-configured resource pool.

It should be understood that the formula (1) is merely an example, and various variations and transformations thereof shall fall within the scope of protection of the present disclosure.

Optionally, in one embodiment of the present disclosure, the network device may send a first bit to the terminal device through the first resource. The value of the first bit indicates the acknowledgement information.

For example, the value of the first bit may be 1.

Exemplarily, if the uplink signal is detected by the network device, a first bit may be sent through the first resource. For example, sending "1" indicates acknowledgement, namely, a successful reception.

Optionally, if the uplink signal is not detected, the acknowledgement information is not sent. For example, the first bit is not sent.

Accordingly, if the terminal device detects the first bit through the first resource, for example, if "1" is detected, it is determined that reception of the uplink signal succeeds. If feedback information is not detected, it is determined that reception of the uplink signal fails.

Optionally, in one embodiment of the present disclosure, the first resource is a first sequence, the parameter of which is associated with the information of the terminal device.

The network device may send the first sequence that indicates the acknowledgement information to the terminal device.

Exemplarily, sequences of different terminal devices have different parameters. As such, the terminal devices may acquire the acknowledgement information by detecting their respective sequences.

If the network device detects the uplink signal, the first sequence is sent, which denotes acknowledgement, namely, successful reception.

If the uplink signal is not detected, the first sequence is not sent.

Accordingly, if the terminal device detects the first sequence, it is determined that reception of the uplink signal succeeds; if the first sequence is not detected, it is determined that reception of the uplink signal fails.

In the forgoing embodiments, if the uplink signal is not detected, the feedback information is not sent. Optionally, if the uplink signal is not detected, negative-acknowledgment information may be sent.

Optionally, in one embodiment of the present disclosure, if the uplink signal is not detected, the network device may send the negative-acknowledgment information to the terminal device through the first resource.

That is, if the uplink signal is detected, the network device sends the acknowledgment information to the terminal device through the first resource; if the uplink signal is not detected, the network device sends the negative-acknowledgment information to the terminal device through the first resource.

Optionally, in one embodiment of the present disclosure, the network device may send a second bit to the terminal device through the first resource. The value of the second bit indicates the negative-acknowledgement information.

For example, the value of the second bit may be 0.

Exemplarily, if the network device detects the uplink signal, the first bit may be sent through the first resource. For example, sending "1" means acknowledgement, namely successful reception. If the uplink signal is not detected by the network device, the second bit may be sent through the first resource. For example, sending "0" means negative acknowledgement, namely, a failed reception.

Accordingly, if the terminal device detects the first bit through the first resource, for example, if "1" is detected, it is determined that reception of the uplink signal succeeds. If the terminal device detects the second bit through the first resource, for example, if "0" is detected, it is determined that reception of the uplink signal fails.

With the method of transmitting information provided by embodiments of the present disclosure, collision of feedback information among the different terminal devices can be avoided in the uplink signal access without grant, and the result of the uplink transmission can be fed back to the terminal devices in time, thereby ensuring the system performance.

The method of transmitting information according to embodiments of the present disclosure is described above from the network device side and will be described below from the terminal device side.

Figure 3:
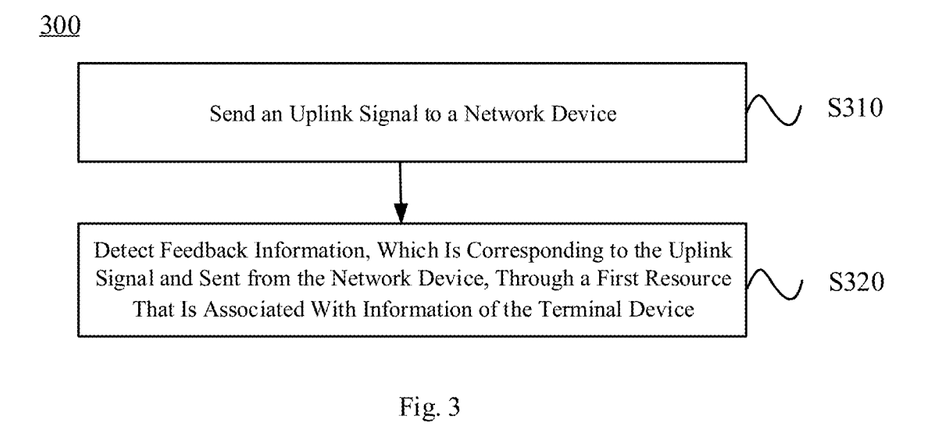
FIG. 3 is a schematic flow chart of a method of transmitting information of another embodiment of the present disclosure.

FIG. 3 shows a schematic flow chart of a method 300 of transmitting information according to an embodiment of the present disclosure. The method 300 is executed by a terminal device, for example, the terminal device in FIG. 1. As shown in FIG. 3, the method 300 includes the following steps.

S310, send an uplink signal to a network device; and

S320, detect feedback information, which is corresponding to the uplink signal and sent from the network device, through a first resource that is associated with information of the terminal device.

In embodiments of the present disclosure, the first resource for sending the feedback information is associated with the information of the terminal device. As such, different first resources are used to send the feedback information for different terminal devices. Thus, acknowledgement information sent to the different terminal devices may not collide.

Thus, with the method of transmitting information, provided by the embodiments of the present disclosure, collision of the feedback information among the different terminal devices can be avoided.

Optionally, in one embodiment of the present disclosure, the terminal device may send the uplink signal on a resource without grant, which is determined by the terminal device.

In the unscheduled/grant-free mode, the terminal device sends the uplink signal on the resource determined by the terminal device. That is, the resource for sending the uplink signal may be selected freely by the terminal device.

In some embodiments of the present disclosure as above described with reference to FIG. 2, the network device determines the first resource to be used in transmitting a feedback information such as acknowledgement information or negative-acknowledgement information to a terminal device based on the information of the terminal device before sending the feedback information. Optionally, in one embodiment of the present disclosure, before performing the step S320, the terminal device also perform a step of determining the first resource, i.e., determining the first resource based on the information of the terminal device. Then, in step S320, the feedback information which is corresponding to the uplink signal and sent from the network device is detected through the determined first resource. It can be understood that based on the information of the same terminal device, both the terminal device and the network device determine the same first resource. It can also be understood that since the first resource is determined based on the distinguishing information of the terminal device, the determined first resource is unique, thereby avoiding the collision of feedback information among different terminal devices.

Optionally, in one embodiment of the present disclosure, determining the first resource based on the information of the terminal device includes determining the first resource based on identification information of the terminal device.

Optionally, in one embodiment of the present disclosure, determining the first resource based on the information of the terminal device includes determining the first resource based on the identification information of the terminal device and at least one of the following:

a starting resource that transmits the uplink signal; and an initial resource of an acknowledgment information pre-configured resource pool.

Optionally, as an example, the first resource can be determined based on the identification information of the terminal device, the starting resource that transmits the uplink signal, the initial resource of the acknowledgement information pre-configured resource pool and a size of the acknowledgement pre-configured resource pool. In an example, any one of location, index, bit, serial number or the like of the first resource can be determined based on the above listed information.

Optionally, in one embodiment of the present disclosure, the first resource is determined based on the following formula:

$$p=K+(m+\mathrm{ID})\mathrm{mod}(L),$$

wherein P denotes index information of the first resource, K denotes information of the initial resource of the acknowledgment information pre-configured resource pool, m denotes information of the starting resource that transmits the uplink signal, ID denotes the identification information of the terminal device, and L denotes the size of the acknowledgment information pre-configured resource pool.

Optionally, in one embodiment of the present disclosure, the identification information of the terminal device includes an RNTI or a pre-configured identity of the terminal device.

Optionally, in one embodiment of the present disclosure, the feedback information can include acknowledgement information that indicates reception of the uplink signal, or negative-acknowledgement information that indicates failed reception of the uplink signal.

Optionally, in one embodiment of the present disclosure, the terminal device detects a first bit sent, which is corresponding to the uplink signal and sent from the network device, through the first resource, wherein the value of the first bit indicates the acknowledgement information.

Optionally, in one embodiment of the present disclosure, if the terminal device detects a first bit, which is sent by the network device, through the first resource, it is determined that reception of the uplink signal succeeds.

Optionally, the value of the first bit is 1.

Optionally, in one embodiment of the present disclosure, the first resource is a first sequence, the parameter of which is associated with the information of the terminal device. The terminal device detects the first sequence which is corresponding to the uplink signal and sent from the network device, wherein the first sequence indicates the acknowledgement information.

If the terminal device detects the first sequence sent by the network device, it is determined that reception of the uplink signal succeeds.

Optionally, in one embodiment of the present disclosure, if the feedback information is not detected by the terminal device through the first resource, it is determined that reception of the uplink signal fails.

For example, if the terminal device detects the first bit through the first resource, for example, if "1" is detected, it is determined that reception of the uplink signal succeeds. If the feedback information is not detected, it is determined that reception of the uplink signal fails.

Alternatively, if the terminal device detects the first sequence, it is determined that reception of the uplink signal succeeds; if the first sequence is not detected, it is determined that reception of the uplink signal fails.

As described in one embodiment above, the network device sends negative-acknowledgement information to the terminal device through the first resource if the uplink signal from the terminal device is not detected. Optionally, in one embodiment of the present disclosure, the terminal device detects the negative-acknowledgement information from the network device through the first resource.

Optionally, in one embodiment of the present disclosure, the terminal device detects a second bit sent from the network device through the first resource, wherein the value of the second bit indicates the negative-acknowledgement information.

Optionally, in one embodiment of the present disclosure, if the terminal device detects a second bit, which is sent by the network device, through the first resource, it is determined that reception of the uplink signal fails.

Optionally, the value of the second bit is 0.

For example, if the terminal device detects the first bit through the first resource, for example, if "1" is detected, it is determined that reception of the uplink signal succeeds. If the terminal device detects the second bit through the first resource, for example, if "0" is detected, it is determined that reception of the uplink signal fails.

With the method of transmitting information provided by embodiments of the present disclosure, collision of the feedback information among different terminal devices may be avoided in the uplink signal access without grant, thereby guaranteeing the system performance.

It should be understood that in the embodiments of the present disclosure, the relevant properties, functions, interactions between the network device and the terminal device and the like described from the network device side correspond to those from the terminal device side, which thus will not be repeated herein for brevity.

It should be understood that in various embodiments of the present disclosure, serial numbers in the above processes do not mean the execution order. The execution order of the processes should be determined based on the functions and the internal logic thereof, and should not limit the implementation process of the embodiments of the present disclosure.

The method of transmitting information according to embodiments of the present disclosure is described above in detail. The network device and the terminal device according to embodiments of the present disclosure will be described below. It should be understood that the network device and the terminal device according to embodiments of the present disclosure can execute the various forgoing methods of embodiments of the present disclosure. That is, corresponding processes in the forgoing method embodiments may be referenced for specific working processes of various devices below.

Figure 4:
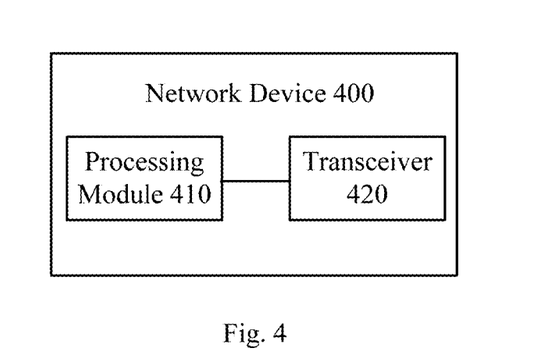
FIG. 4 is a schematic block diagram of a network device of one embodiment of the present disclosure.

FIG. 4 shows a schematic block diagram of a network device 400 according to an embodiment of the present disclosure. As shown in FIG. 4, the network device 400 includes:

a processing module 410 configured to detect an uplink signal sent by a terminal device; and a transceiver 420 configured to send acknowledgment information to the terminal device through a first resource if the uplink signal is detected, wherein the first resource is associated with information of the terminal device.

With the network device of the embodiment of the present disclosure, the collision of feedback information between different terminal devices can be avoided by sending the acknowledgment information to a terminal device on the first resource associated with information of the terminal device.

Optionally, in one embodiment of the present disclosure, the uplink signal is sent without grant.

Optionally, in one embodiment of the present disclosure, the processing module 410 also determines the first resource based on the information of the terminal device. Then, the transceiver 420 sends the acknowledgement information through the first resource determined by the processing module 410.

Optionally, in one embodiment of the present disclosure, the processing module 410 determines the first resource based on identification information of the terminal device.

Optionally, in one embodiment of the present disclosure, the processing module 410 determines the first resource based on identification information of the terminal device and at least one of the following:

a starting resource that transmits the uplink signal; and an initial resource of an acknowledgment information pre-configured resource pool.

Optionally, as an example, the processing module 410 can determine the first resource based on the identification information of the terminal device, the starting resource that transmits the uplink signal, the initial resource of the acknowledgement information pre-configured resource pool and a size of the acknowledgement information pre-configured resource pool. In an example, any one of location, index, bit, serial number or the like of the first resource can be determined based on the above listed information.

Optionally, in one embodiment of the present disclosure, the processing module 410 determines the first resource based on the following formula:

$$p=K+(m+\text{ID})\bmod(L),$$

wherein P denotes index information of the first resource, K denotes information of the initial resource of the acknowledgment information pre-configured resource pool, m denotes information of the starting resource that transmits the uplink signal, ID denotes the identification information of the terminal device, and L denotes the size of the acknowledgment information pre-configured resource pool.

Optionally, in one embodiment of the present disclosure, the identification information of the terminal device includes a radio network temporary identity (RNTI) or a pre-configured identity of the terminal device.

Optionally, in one embodiment of the present disclosure, the transceiver 420 is configured to send a first bit to the terminal device through the first resource, wherein the value of the first bit indicates the acknowledgement information.

Optionally, in one embodiment of the present disclosure, the value of the first bit is 1.

Optionally, in one embodiment of the present disclosure, the first resource is a first sequence, the parameter of which is associated with the information of the terminal device; and the transceiver 420 is configured to send the first sequence to the terminal device, wherein the first sequence indicates the acknowledgement information.

Optionally, in one embodiment of the present disclosure, the transceiver 420 is further configured not to send the acknowledgment information if the uplink signal is not detected.

Optionally, in one embodiment of the present disclosure, the transceiver 420 is further configured to send negative-acknowledgment information to the terminal device through the first resource if the uplink signal is not detected.

Optionally, in one embodiment of the present disclosure, the transceiver 420 is configured to send a second bit to the terminal device through the first resource, wherein the value of the second bit indicates the negative-acknowledgement information.

Optionally, in one embodiment of the present disclosure, the value of the second bit is 0.

According to the network device of embodiments of the present disclosure, the collision of feedback information between different terminal devices can be avoided in the unscheduled uplink signal access and a result of the uplink transmission is fed back to the terminal device in time, thereby guaranteeing the system performance.

The network device 400 according to embodiments of the present disclosure can correspond to a network device in the method of transmitting information according to embodiments of the present disclosure, and the above and other operations and/or functions of various modules in the network device 400 are intended to implement corresponding processes of foregoing methods respectively, which are not repeated herein for brevity.

Figure 5:
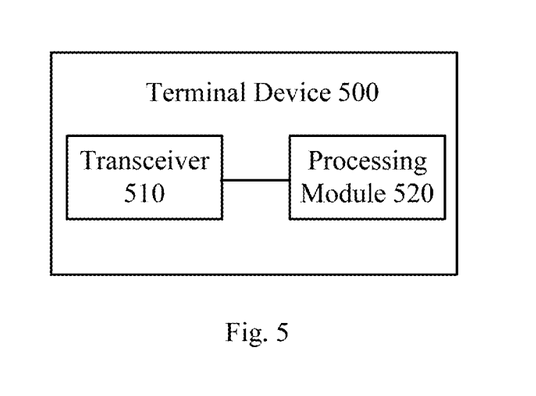
FIG. 5 is a schematic block diagram of a terminal device of one embodiment of the present disclosure.

FIG. 5 shows a schematic block diagram of a terminal device 500 according to an embodiment of the present disclosure. As shown in FIG. 5, the terminal device 500 includes:

a transceiver 510 configured to send an uplink signal to a network device; and a processing module 520 configured to detect feedback information, which is corresponding to the uplink signal and sent from the network device, through a first resource, wherein the first resource is associated with information of the terminal device.

The terminal device of embodiments of the present disclosure can avoid collision of feedback information between different terminal devices through the above technical solution.

Optionally, in one embodiment of the present disclosure, the transceiver 510 is configured to send the uplink signal without grant on a resource determined by the terminal device.

In some embodiments of the present disclosure as above described with reference to FIG. 4, the processing module 410 of the network device determines the first resource to be used in transmitting a feedback information such as acknowledgement information or negative-acknowledgement information to a terminal device based on the information of the terminal device before sending the feedback information. Optionally, in one embodiment of the present disclosure, before detecting the feedback information, the processing module 520 of the terminal device determines the first resource, i.e., determines the first resource based on the information of the terminal device. Then, the processing module 520 detects the feedback information, which is corresponding to the uplink signal and sent from the network device, through the determined first resource. It can be understood that based on the information of the same terminal device, both the processing module 520 of the terminal device and the processing module 410 of the network device determine the same first resource. It can also be understood that since the first resource is determined based on the distinguishing information of the terminal device, the determined first resource is unique, thereby avoiding the collision of feedback information among different terminal devices.

Optionally, in one embodiment of the present disclosure, the processing module 520 determines the first resource based on identification information of the terminal device.

Optionally, in one embodiment of the present disclosure, the processing module 520 determines the first resource based on identification information of the terminal device and at least one of the following:

a starting resource that transmits the uplink signal; and an initial resource of an acknowledgment information pre-configured resource pool.

Optionally, as an example, the processing module 520 can determine the first resource based on the identification information of the terminal device, the starting resource of that transmits the uplink signal, the initial resource of the acknowledgement information pre-configured resource pool and a size of the acknowledgement information pre-configured resource pool. In an example, any one of location, index, bit, serial number or the like of the first resource can be determined based on the above listed information.

Optionally, in one embodiment of the present disclosure, the processing module 520 determines the first resource based on the following formula:

$$p = K + (m + \text{ID}) \bmod(L),$$

wherein P denotes index information of the first resource, K denotes information of the initial resource of the acknowledgment information pre-configured resource pool, m denotes information of the starting resource that transmits the uplink signal, ID denotes the identification information of the terminal device, and L denotes the size of the acknowledgment information pre-configured resource pool.

Optionally, in one embodiment of the present disclosure, the identification information of the terminal device includes a radio network temporary identity (RNTI) or a pre-configured identity of the terminal device.

Optionally, in one embodiment of the present disclosure, the feedback information can includes acknowledgement information that indicates reception of the uplink signal or negative-acknowledgement information that indicates failed reception of the uplink signal.

Optionally, in one embodiment of the present disclosure, the processing module is configured to detect a first bit, which is corresponding to the uplink signal and sent from the network device, through the first resource, wherein the value of the first bit indicates the acknowledgement information.

Optionally, in one embodiment of the present disclosure, the processing module 520 is further configured to determine that reception of the uplink signal succeeds if a first bit sent by the network device is detected through the first resource.

Optionally, in one embodiment of the present disclosure, the value of the first bit is 1.

Optionally, in one embodiment of the present disclosure, the first resource is a first sequence, the parameter of which is associated with the information of the terminal device; and the processing module 520 is further configured to detect the first sequence which is corresponding to the uplink signal and sent from the network device, wherein the first sequence indicates the acknowledgement information; and determine that reception of the uplink signal succeeds if the first sequence sent by the network device is detected; or determine that reception of the uplink signal fails if the first sequence sent by the network device is not detected.

Optionally, in one embodiment of the present disclosure, the processing module 520 is further configured to determine that reception of the uplink signal fails if the feedback information is not detected through the first resource.

Optionally, in one embodiment of the present disclosure, the processing module 520 is configured to detect the negative-acknowledgement information sent from the network device through the first resource.

Optionally, in one embodiment of the present disclosure, the processing module 520 is further configured to detect a second bit sent from the network device through the first resource, wherein the value of the second bit indicates the negative-acknowledgement information.

Optionally, in one embodiment of the present disclosure, the processing module 520 is further configured to determine that reception of the uplink signal fails if a second bit sent by the network device is detected through the first resource.

Optionally, in one embodiment of the present disclosure, the value of the second bit is 0.

With the terminal device of embodiments of the present disclosure, the collision of feedback information between different terminal devices can be avoided in the uplink signal access without grant, thereby guaranteeing the system performance.

The terminal device 500 according to the embodiment of the present disclosure may correspond to a terminal device in the method of transmitting information according to embodiments of the present disclosure and the above and other operations and/functions of various modules in the terminal device 500 are intended to implement corresponding processes of foregoing methods respectively, which are not repeated herein for brevity.

Figure 6:
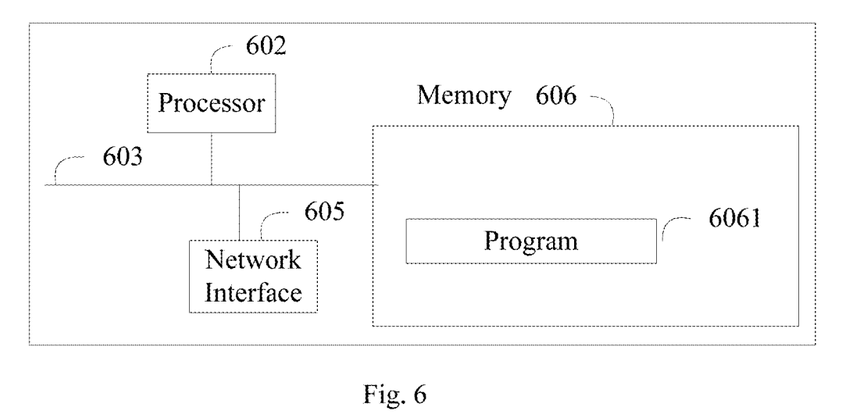
FIG. 6 is a schematic structure diagram of a network device of another embodiment of the present disclosure.

FIG. 6 shows the structure of a network device provided by another embodiment of the present disclosure. The network device includes at least one processor 602 (such as CPU), at least one network interface 605 or other communication interface, a memory 606 and at least one communication bus 603 for implementing connection and communication between these components. The processor 602 is configured to execute an executable module stored in the memory 606, such as a computer program. The memory 606 may include a high-speed random access memory (RAM) and may also include a non-volatile memory, such as at least one disk memory. The communication with at least one other network element is implemented through the at least one network interface 605 (wired or wireless).

In some implementation modes, the memory 606 stores a program 6061 and the processor 602 executes the program 6061 for executing the methods in above various embodiments of the present disclosure.

Figure 7:
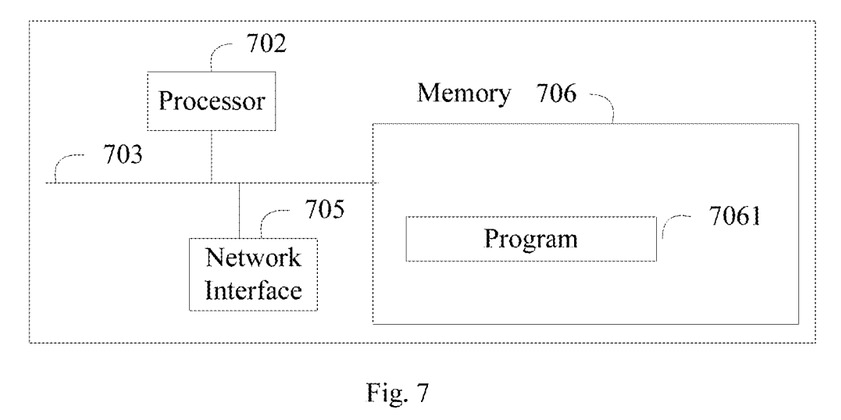
FIG. 7 is a schematic structure diagram of a terminal device of another embodiment of the present disclosure.

FIG. 7 shows the structure of a terminal device provided by another embodiment of the present disclosure, which includes at least one processor 702 (such as CPU), at least one network interface 705 or other communication interface, a memory 706 and at least one communication bus 703 for implementing connection and communication between these components. The processor 702 is configured to execute an executable module stored in the memory 706, such as a computer program. The memory 706 may include a high-speed random access memory (RAM) and may also include a non-volatile memory, such as at least one disk memory. The communication with at least one other network element is implemented through the at least one network interface 705 (wired or wireless).

In some implementation modes, the memory 706 stores a program 7061 and the processor 702 executes the program 7061 for executing the methods in above various embodiments of the present disclosure.

It should be understood that the specific examples in the embodiments of the present disclosure are only intended to assist a person skilled in the art to better understand the embodiments of the present disclosure, rather than limiting the scope of the embodiments of the present disclosure.

It should be understood that the term "and/or" only describes an association relationship between associated objects and indicates that there may be three relationships. For example, A and/or B may indicate that there are three cases where A exists separately, A and B exist at the same time, and B exists separately. In addition, the character "/" herein generally indicates that an "or" relationship exists between associated objects.

It should be appreciated by an ordinary person skilled in the art that various units and algorithm steps of various examples described in conjunction with the embodiments disclosed herein may be implemented in electronic hardware, computer software or a combination thereof. In order to clearly illustrate the interchangeability between the hardware and the software, the components and steps of various examples are described generally according to functions in the above description. Whether these functions are implemented in hardware or software depends on specific applications and design constraints of technical solutions. A person skilled in the art may implement the described functions with different methods for each of specific applications, but such implementations shall not be regarded as going beyond the scope of the present disclosure.

A person skilled in the art may clearly understand that for the sake of convenience and conciseness in description, corresponding processes in the forgoing method embodiments can be referenced for the specific work processes of the systems, devices and units described in the above, which are not further described herein.

In several embodiments provided by the present application, it should be understood that the disclosed systems, devices and methods may be implemented by other means. For example, the device embodiments described above are merely schematic. For example, the partitioning of the units may be a partitioning in logical functions. There may be other manners for partitioning in actual implementation. For example, multiple units or components may be combined together or integrated into another system, or some features can be omitted or not executed. In addition, mutual couplings or direct couplings or communication connections that are shown or discussed may be indirect couplings or communication connections through some interfaces, devices or units, and may be in electrical, mechanical or other forms.

The units described as separated components may be or may not be physically separated. The components shown as units may be or may not be physical units, that is, they may be located in one place or may be distributed on a plurality of network units. Part or all of the units may be selected according to actual needs to achieve the purposes of the solutions of the embodiments of the present disclosure.

In addition, all functional units in the embodiments of the present disclosure may be integrated into one processing unit. Or, each unit exists independently in physics. Or, two or more units may be integrated into one unit. The above integrated units may be implemented in the form of hardware or a software functional unit.

The integrated units, if implemented in the form of the software functional unit and sold or used as a standalone product, may be stored in a computer-readable storage medium. Based on such an understanding, the technical solution of the present application in essence, or the part that contributes to the prior art, or all or part of the technical solution, may be embodied in the form of a software product. The computer software product is stored in a storage medium and includes a plurality of instructions for a computer device (which may be a personal computer, a server, a network device or the like) to execute all or part of the steps of the method described in the embodiments of the present application. The foregoing storage medium includes various media that may store program codes, such as a USB flash disk, a mobile hard disk, a read-only memory (ROM), a random access memory (RAM), a magnetic disk, an optical disk, or the like.

The above description is merely a specific implementation mode of the present disclosure, but the scope of protection of the present disclosure is not limited to this. Any equivalent modification or replacement that would be readily conceived by any person skilled in the art within the scope of the technology disclosed in the present disclosure should be within the scope of protection of the present disclosure. Therefore, the scope of protection of the present disclosure shall be defined by the claims.

What is claimed is:

1. A method of transmitting information, comprising:
   sending an uplink signal to a network device;
   determining a first resource based on information of an initial resource of an acknowledgment information pre-configured resource pool, information of a starting resource that transmits the uplink signal, identification information of the terminal device, and a size of the acknowledgment information pre-configured resource pool; and
   detecting feedback information, which is corresponding to the uplink signal and sent from the network device, through the first resource, wherein the first resource is associated with information of a terminal device.

2. The method according to claim 1, wherein the sending an uplink signal to the network device comprises:
   sending the uplink signal without grant on a resource determined by the terminal device.

3. The method according to claim 1, further comprising:
   determining the first resource based on identification information of the terminal device.

4. The method according to claim 3, wherein the identification information of the terminal device comprises a radio network temporary identity (RNTI) or a pre-configured identity of the terminal device.

5. The method according to claim 1, wherein the feedback information comprises acknowledgement information that indicates reception of the uplink signal, the detecting feedback information, which is corresponding to the uplink signal and sent from the network device, through the first resource comprises:
   detecting a first bit, which is corresponding to the uplink signal and sent from the network device, through the first resource, wherein a value of the first bit indicates the acknowledgement information.

6. The method according to claim 1, wherein the first resource is a first sequence, a parameter of which is associated with the information of the terminal device; and
   wherein the feedback information comprises acknowledgement information that indicates reception of the uplink signal, the detecting feedback information, which is corresponding to the uplink signal and sent from the network device, through a first resource comprises:
   detecting the first sequence which is corresponding to the uplink signal and sent from the network device, wherein the first sequence indicates the acknowledgement information.

7. The method according to claim 1, wherein the feedback information comprises negative-acknowledgement information that indicates failed reception of the uplink signal, the method further comprises:
   detecting the negative-acknowledgement information from the network device through the first resource.

8. The method according to claim 7, wherein the detecting the negative-acknowledgement information from the network device through the first resource comprises:
   detecting a second bit sent by the network device through the first resource, wherein a value of the second bit indicates the negative-acknowledgement information.

9. A terminal device comprising:
   a memory configured to store instructions;
   a processor; and
   a communication interface configured to communicate with other network elements under control of the processor,
   wherein the processor is connected with the memory and the communication interface and configured to execute the instructions stored in the memory, and wherein the processor is configured, when executing the instructions, to:
   send an uplink signal without grant to a network device;
   determine a first resource based on information of an initial resource of an acknowledgment information pre-configured resource pool, information of a starting resource that transmits the uplink signal, identification information of the terminal device, and a size of the acknowledgment information pre-configured resource pool; and
   detect feedback information, which is corresponding to the uplink signal and sent from the network device, through the first resource, wherein the first resource is associated with information of a terminal device.

10. The terminal device according to claim 9, wherein the processor is further configured, when executing the instructions, to:
    determine the first resource based on identification information of the terminal device.

11. A method of transmitting information, comprising:
    detecting an uplink signal sent by a terminal device;
    determining a first resource based on information of an initial resource of an acknowledgment information pre-configured resource pool, information of a starting resource that transmits the uplink signal, identification information of the terminal device, and a size of the acknowledgment information pre-configured resource pool; and
    sending acknowledgment information to the terminal device through the first resource if the uplink signal is detected, wherein the first resource is associated with information of the terminal device.

12. The method according to claim 11, wherein the uplink signal is sent without grant.

13. The method according to claim 11, further comprising:
    determining the first resource based on identification information of the terminal device.

14. The method according to claim 13, wherein the identification information of the terminal device comprises a radio network temporary identity (RNTI) or a pre-configured identity of the terminal device.

* * * * *